United States Patent
Aljundi et al.

(10) Patent No.: US 11,571,665 B2
(45) Date of Patent: Feb. 7, 2023

(54) LAYERED CDC-POLYAMIDE MEMBRANE AND ITS MAKE AND USE

(71) Applicant: King Fahd University of Petroleum and Minerals, Dhahran (SA)

(72) Inventors: Isam H. Aljundi, Dhahran (SA); Abdelrahman M. Awad, Dhahran (SA)

(73) Assignee: King Fahd University of Petroleum and Minerals, Dhahran (SA)

( * ) Notice: Subject to any disclaimer, the term of this patent is extended or adjusted under 35 U.S.C. 154(b) by 0 days.

(21) Appl. No.: 16/238,010

(22) Filed: Jan. 2, 2019

(65) Prior Publication Data

US 2020/0206695 A1    Jul. 2, 2020

(51) Int. Cl.
| | |
|---|---|
| *B01D 69/14* | (2006.01) |
| *B01D 69/12* | (2006.01) |
| *B01D 67/00* | (2006.01) |
| *B01D 71/56* | (2006.01) |
| *B01D 53/22* | (2006.01) |
| *B01D 71/02* | (2006.01) |

(52) U.S. Cl.
CPC ......... *B01D 69/148* (2013.01); *B01D 53/228* (2013.01); *B01D 67/0079* (2013.01); *B01D 69/12* (2013.01); *B01D 71/021* (2013.01); *B01D 71/56* (2013.01)

(58) Field of Classification Search
None
See application file for complete search history.

(56) References Cited

U.S. PATENT DOCUMENTS

| | | | | |
|---|---|---|---|---|
| 4,933,082 | A | * | 6/1990 | Yamada ................. B01D 69/12 210/500.38 |
| 5,127,925 | A | * | 7/1992 | Kulprathipanja .... B01D 69/148 95/138 |
| 2009/0155464 | A1 | * | 6/2009 | Liu ....................... B01D 69/148 427/243 |
| 2012/0093709 | A1 | | 4/2012 | Gogotsi et al. |

(Continued)

FOREIGN PATENT DOCUMENTS

WO    2012/119994 A2    9/2012

OTHER PUBLICATIONS

Khan, Anwar Ul Haq et al., "Improved hydrophilicity and antifouling properties of polyamide TFN membrane comprising carbide derived carbon", Desalination, 420, 2017, pp. 125-135. (Year: 2017).*

(Continued)

*Primary Examiner* — Jason M Greene
(74) *Attorney, Agent, or Firm* — Oblon, McClelland, Maier & Neustadt, L.L.P.

(57) ABSTRACT

New carbon nanomaterials, preferably titanium carbide-derived carbon (CDC) nanoparticles, were embedded into a polyamide film to give CDC/polyamide mixed matrix membranes by the interfacial polymerization reaction of an aliphatic diamine, e.g., piperazine, and an activated aromatic dicarboxylate, e.g., isophthaloyl chloride, supported on a sulfone-containing polymer, e.g., polysulfone (PSF), layer, which is preferably previously prepared by dry/wet phase inversion. The inventive membranes can separate $CO_2$ (or other gases) from mixtures of $CO_2$ and further gases, esp. $CH_4$, based upon the generally selective nanocomposite layer(s) of CDC/polyamide.

18 Claims, 7 Drawing Sheets

(56) References Cited

U.S. PATENT DOCUMENTS

2013/0146530 A1\* 6/2013 Wang .................. B01D 69/148
    210/500.38
2014/0210118 A1 7/2014 Lee et al.
2015/0217238 A1\* 8/2015 Tang ..................... B01D 69/12
    210/483

OTHER PUBLICATIONS

Khan, et al. ; Improved hydrophilicity and anti-fouling properties of polyamide TFN membrane comprising carbide derived carbon ; ScienceDirect; Desalination 420 ; pp. 125-135 ; Jul. 3, 2017 ; 12 Pages.

Martin, et al. ; Titanium Carbide and Carbide-Derived Carbon Composite Nano_bers by Electrospinning of Ti-Resin Precursor ; Chemie Ingenieur Technik ; Sep. 6, 2013 ; Abstract Only ;1 Page.

Gogotsi, et al. ; Nanoporous Carbide Derived Carbon with Tunable Pore Size ; University of Pennsylvania ScholarlyCommons ; Department of Materials Science & Engineerings, Departmental Papers (MSE) ; Sep. 2003 ; 24 Pages.

Khan ; Water Desalination Using Carbide Derived Carbon (CDC)/ Mixed Matrix Membrane ; Master's Thesis ; May 2006 ; 115 Pages.

\* cited by examiner

LAYERED CDC-POLYAMIDE MEMBRANE AND ITS MAKE AND USE

BACKGROUND OF THE INVENTION

Field of the Invention

This application relates to gas separation, particularly $CO_2$ separation, membranes useful for gas separation, and methods of making such membranes.

Description of the Related Art

Gas separation using membranes, particularly polymer membranes, has been a subject of research interest for several decades. Gas separation is of particular interest to petroleum producers and refiners, chemical companies, and industrial gas suppliers. Certain separations have been implemented commercially, such as carbon dioxide ($CO_2$) removal from natural gas, fermentation gases, and in enhanced oil recovery, as has hydrogen ($H_2$) removal from nitrogen ($N_2$), methane ($CH_4$), argon, and ammonia ($NH_3$).

Membranes used in commercial gas separation applications are often polymeric and nonporous, with separations being based on a solution-diffusion mechanism involving molecular-scale interactions of the permeating gas with the membrane polymer. Solution-diffusion assumes a membrane having two opposing surfaces, with components being adsorbed by the membrane at one surface, transported through the membrane by a gas concentration gradient, and desorbed at the opposing surface. Membrane separation performance for a given pair of gases, e.g., $CO_2/CH_4$, $O_2/N_2$, $H_2/CH_4$, can be evaluated by (1) the permeability coefficient of the membrane and (2) the selectivity of the membrane. The permeability coefficient is the product of the gas flux and the membrane skin thickness, divided by the pressure difference across the membrane. Selectivity is the ratio of the permeability coefficients of the two gases, the more permeable gas over the less permeable. Relevant factors, such as the diffusion coefficient and the solubility coefficient, respectively decrease and increase (generally) with increasing molecular size of the gas. Higher permeability allows a reduction in the membrane area necessary to treat a given volume of gas, and higher selectivity provides higher purity product gas.

Polymeric membrane materials are often used by contacting a feed gas mixture on an upstream side of the membrane, giving a permeate mixture on the membrane's downstream side with a greater concentration of one of the components from the feed mixture relative to the original feed gas mixture composition. Maintaining a pressure differential between the upstream and downstream sides can be used to drive permeation. The downstream side can be maintained at an underpressure, and/or the upstream side can be maintained at an overpressure, i.e., upstream should be higher pressure than downstream.

Various materials, such as fibers, porous supports, etc., have been incorporated into polymeric membranes, e.g., to provide mechanical strength to the membranes. Some composite materials have shown improved liquid separation properties over the polymer material themselves. Membrane materials with incorporated materials within a polymeric matrix, e.g., Type 5A zeolites into silicone rubber, a hydrophobic crystalline silica-based zeolite into silicone rubber or cellulose acetate, Type 4A zeolite into polyethersulfone, zeolite 4A into polyetherimide, etc., have also been used for gas separations. However, at least some of these have suffered equilibration to steady state after adsorption site saturation.

Accordingly, further research has been conducted into different material for use in polymer membrane gas separation. For example, US 2014/0210118 A1 by Lee et al. (Lee) discloses a polymer or polymer composite membrane having through-thickness micropores and its preparation The polymer/composite membrane has a pore structure in which micropores are aligned in a mesh structure in the thickness direction of the polymer or polymer composite membrane due to unidirectional freezing in the thickness direction of a solvent. Lee's membrane has through-thickness micropores, and has permeability in the thickness direction and superior uniformity in size of the micropores and wall thickness between the micropores. Lee reports that the membrane can be used as a porous membrane substrate, microfiltration membrane, etc., but specifically describes its use as a battery separator.

Lee only discloses using fluorine-based (co)polymers, based on vinylidene fluoride (VDF), tetrafluoroethylene (TFE), ethylenetetrafluoroethylene (ETFE), perfluoroalkoxyalkane (PFA), vinylfluoride (VF), chlorotrifluoroethylene (CTFE), fluorinated ethylene propylene (FEP), hexafluoropropylene (HFP), and/or perfluoro (propyl vinylether), and hydrophobic polymers, including polyethylene, polypropylene, polysulfone, polyketone, polyethersulfone, cellulose, cellulose acetate, cellulose triacetate, regenerative cellulose, acryl resin, nylon, polyamide, epoxy, and polyimide-based (co)polymers. Lee's polymer may include inorganic materials, such as titanium oxide, (fumed) silica, silicon carbide, silicon nitride, spinel, silicon oxycarbide, glass powder, glass fiber, carbon fiber, graphene, nanotubes, gold microparticles, silver microparticles, alumina, magnesia, silicon nitride, zirconia, zirconium carbide, sialon, nasicon, silceram, mullite, aluminum, copper, nickel, steel, titanium, titanium carbide, and titanium diborate. However, Lee does not disclose a multi-layer membrane, nor does Lee disclose a polyamide membrane or the incorporation of CDC into the polyamide layer to fabricate the mixed matrix membrane. Furthermore, Lee does not disclose separating carbon dioxide from methane.

US 2012/0093709 A1 by Gogotsi et al. (Gogotsi) discloses a method for producing a nanoporous carbide-derived carbon (CDC) composition with a tunable pore structure and a narrow pore size, as well as compositions prepared by the method. Gogotsi describes exposing a metal carbide to a halogen, e.g., fluorine, chlorine, bromine, and/or iodine, so that the metal is extracted from the carbide. Gogotsi describes relevant metal carbides to include SiC, TiC, ZrC, $B_4C$, TaC, $Mo_2C$, and $Ti_3SiC_2$. Gogotsi describes using its compositions in, e.g., molecular sieves, gas storage, catalysts, adsorbents, battery electrodes, supercapacitors, water or air filters, and medical devices.

However, Gogotsi discloses neither a polyamide membrane nor a multi-layer membrane. Moreover, Gogotsi provides no information on using CDC as fillers to prepare the mixed matrix membrane. Gogotsi does not disclose separating $CO_2$ from methane.

*Nature Materials* 2013, 2(9), 591-594 by Gogotsi et al. (Gogotsi NPL) discloses carbide-derived carbons (CDCs) as nanoporous carbons with porosity that can be tuned with sub-Angstrom accuracy in the range 0.5 to 2 nm. The Gogotsi NPL states that CDCs have a narrower pore size distribution than single-wall carbon nanotubes or activated carbons, and that CDC pore size distribution is comparable with that of zeolites. The Gogotsi NPL describes producing CDCs at temperatures from 200 to 1200° C. as powders, coatings, membranes, or parts with near-final shapes, with or without mesopores. The Gogotsi NPL states that molecular sieves, gas storage, catalysts, adsorbents, battery electrodes, supercapacitors, water/air filters, and medical devices could be applications for its CDCs.

The Gogotsi NPL discloses making CDCs from $Ti_3SiC_2$, TiC, SiC, and describes that CDCs can be made from SiC, TiC, ZrC, $B_4C$, TaC, $Mo_2C$ and many others. The Gogotsi NPL does not disclose preparing a polyamide membrane, nor a multi-layer membrane, nor using CDC as fillers in a mixed matrix membrane. Additionally, the Gogotsi NPL does not disclose separating gases, much less separating $CO_2$ from methane.

WO 2012/119994 A2 by Aabloo et al. (Aabloo), which cites Gogotsi and other CDC references, discloses a sensor material used, e.g., in robotics, biotechnology, and (bio) medicine, wherein the sensor material is manufactured from carbon-ionic liquid-polymer composite, comprising at least two separator layers, which are made from carbon-ionic liquid-polymer composite material and comprise at least two electrode layers manufactured of carbon film and separated by a layer manufactured as porous polymer membrane comprising an ionic liquid not having electronic conductivity. At the same time Aabloo's sensor material acts as actuator, which allows immediate feedback of the actuator curvature, its velocity and change of direction of movement.

Aabloo describes carbide-derived carbon material (CDC) from TiC, $B_4C$, and $Mo_2C$, treated at varied temperatures to vary pore distribution in carbon material, and aggregated in an electrode layer with poly(vinylidene difluoridehexafluoropropylene) (PVdF(HFP)). Aabloo describes that fluoropolymers can generally be used, as well as cellulose-based polymers. However, Aabloo discloses no polyamide membrane, nor a multi-layer membrane. Aabloo does not disclose separating gases with its membrane, let alone $CO_2$ from methane.

*Desalination* 2017, 420, 125-135, by Khan et al. (Khan) discloses improving the fouling resistance of reverse osmosis (RO) membranes, a characteristic that is a valuable property in the desalination industry. Khan reports the preparation of carbide derived carbon (CDC)/polyamide hybrid membrane, aiming to improve the fouling-resistance of RO membranes. TEM images of Khan's CDC particles show a mixture of amorphous and ordered graphitized carbon and their degree of ordering that is directly proportional to the chlorination temperature. SEM images of Khan's membranes show a ridge-valley structure of aromatic polyamide. Khan reports improved surface hydrophilicity of its membrane compared a control polyamide membrane. Desalination experiments showed that the permeate flux increased 51%, 45%, and 38% under pure water, brackish water, and fouling conditions; respectively. Khan's control membrane lost 26% of its initial flux while a CDC-doped membrane lost only 11.5% after 2 hours of continuous operation. Khan reports that CDC can significantly enhance the fouling resistance and permeability of its polyamide RO-membranes.

The master's thesis by Anwar ul Haq Khan entitled "Water Desalination Using Carbide Derived Carbon (CDC)/Mixed Matrix Membrane," published in May of 2016 in the Faculty of Chemical Engineering at the King Fand University of Petroleum & Minerals (Khan Thesis—incorporated herein by reference in its entirety) discloses microporous carbide derived carbons (CDCs) nanocarbon materials used as nanofiller in TFN membranes for water desalination experiments. The Khan Thesis describes materials similar to those described in Khan, and discloses that membrane cleaning with dilute NaOH solution was able to recover 97% of the original water flux for reverse osmosis. The Khan Thesis recommends preparing an inorganic CDC membrane, testing long term membrane stability, checking nano particle leaching, and covalently bonding the CDCs to the PA layer.

Khan discloses including CDC particles, prepared from TiC with $Cl_2$ at 700, 800, and 900° C., in thin film nanocomposites (TFNs) and thin film composites (TFCs) at concentrations 0.001, 0.002, 0.003, and 0.0033 w/v %), and polymers comprising units of m-phenylenediamine (MPD, an aryl diamine) and trimesoyl chloride (TMC, an aryl tri-carboxylic acid chloride), as well as a polysulfone (average MW~35,000) substrate for a very thin polyamide (PA) thin layer prepared by interfacial polymerization of m-phenylenediamine (MPD) and trimesoyl chloride (TMC). Khan does not disclose a polyamide including an aliphatic monomer, much less an heteroatom substituted aliphatic amine having cyclical nitrogen atoms, e.g., piperazine, nor a dicarboxylic acid halide, such as isophthaloyl chloride (IPC) as monomers for a polyamide. Khan fails to disclose combining certain ratios of polysulfone, dimethyl acetamide (DMAc), and tetrahydofuran (THF), to prepare a polysulfone support. Moreover, Khan does not disclose separating gases, much less $CO_2$ from methane.

*Chemie Ing. Techn.* 2013, 85(11), 1742-1748 by Martin et al. (Martin) discloses $TiO_2/C$ and TiC/C composite nanofibers produced by electrospinning of resin/$TiCl_4$ precursor solution. Martin's ceramic fiber webs were porous and showed surface areas as high as 523 $m^2/g$. They were further converted to carbide-derived carbon (CDC) fibers under full retention of the fiber-like shape and flexibility. Martin reports a hierarchical pore structure and a specific surface as high as 1378 $m^2/g$ for CDC membranes, proposing high temperature filtration, catalyst support, and energy storage as applications.

However, Martin does not disclose preparing multi-layer membranes. Martin discloses neither a polyamide membrane, nor the incorporation of CDC into a polyamide layer, nor fabricating a mixed matrix membrane, nor separating $CO_2$ from methane.

U.S. Pat. No. 7,485,173 B1 and U.S. Pat. No. 7,806,962 (published as US 2009/0031897 A1) to Liu et al. (Liu), disclose cross-linkable and cross-linked mixed matrix membranes and the use of such membranes for separations such as for $CO_2/CH_4$, $H_2/CH_4$ and propylene/propane separations. Liu prepares cross-linkable and cross-linked mixed matrix membranes (MMMs) by incorporating microporous molecular sieves or soluble high surface area microporous polymers (PIMs) as dispersed microporous fillers into a continuous cross-linkable polymer matrix. Liu's cross-linked MMMs were prepared by UV-cross-linking the cross-linkable MMMs containing cross-linkable polymer matrix such as BP-55 polyimide. Liu reports that pure gas permeation test results demonstrated that both types of MMMs exhibited higher performance for $CO_2/CH_4$ and $H_2/CH_4$ separations than those of the corresponding cross-linkable and cross-linked pure polymer matrices.

Liu uses a cross-linkable polymer, which may be any polymer containing UV-crosslinkable benzophenone, acrylic, vinyl, styrenic, styrenicacrylic, sulfonic, and/or 2,3-dihydrofuran group(s), such as polyacrylates, polyimides such as poly[1,2,4,5-benzentetracarboxylic dianhydride-co-3,3',4,4'-benzophenonetetracarboxylic dianhydride-co-4,4'-methylenebis(2,6-dimethylaniline)] imides (e.g., BP-55 with 1:1 ratio of 1,2,4,5-benzentetracarboxylic dianhydride and 3,3',4,4'-benzophenonetetracarboxylic dianhydride in this polyimide); poly(styrenes), including styrene-containing copolymers such as acrylonitrilestyrene copolymers, styrenebutadiene copolymers and styrene-vinylbenzylhalide copolymers; polysulfone; and polyethersulfone. Liu's MMMs contain organic or inorganic microporous molecular sieves, which inorganics may be SAPO-34, Si-DDR, AlPO-14, AlPO-34, AlPO-18, LTA, ERS-12, NaA (4A), CaA (5A), KA (3A), CDS-1, SSZ-62, UZM-9, UZM-13, UZM-17, UZM-19, MCM-65, MCM-47, medium pore molecular sieves such as silicalite-1, Si-MTW, UZM-8, SAPO-31, EU-1, ZSM-57, NU-87, Si-BlEA, Si-MEL, and large pore molecular sieves such as FAU, OFF, zeolite L, NaX, NaY, and CaY. Liu reports that for a mixed matrix membrane with 30 wt. % of AlPO-18 fillers in a BP-55 polymer matrix, the permeability increased by 57% compared to a pure BP-55 membrane, while the selectivity increased by 17%. However, Liu does not disclose polyamides, nor multi-layered membranes, nor CDCs.

US 2009/0131242 A1 by Liu et al. (Liu 242) discloses a method of making polymer-functionalized molecular sieve/ polymer mixed matrix membranes (MMMs) with either no macrovoids or voids of less than several Angstroms at the interface of the polymer matrix and the molecular sieves by incorporating polyethersulfone (PES) or cellulose triacetate (CTA) functionalized molecular sieves into a continuous polyimide or cellulose acetate polymer matrix. Liu 242's MMMs, esp. PES functionalized AlPO-14/polyimide MMMs and CTA functionalized AlPO-14/CA MMMs have good flexibility and high mechanical strength, and exhibit significantly enhanced selectivity and/or permeability over the polymer membranes made from the corresponding continuous polymer matrices for carbon dioxide/methane ($CO_2$/$CH_4$), hydrogen/methane ($H_2$/$CH_4$), and propylene/propane separations. Liu 242's MMMs are reported to be suitable for a variety of liquid, gas, and vapor separations such as deep desulphurization of gasoline and diesel fuels, ethanol/water separations, pervaporation dehydration of aqueous/organic mixtures, $CO_2$/$CH_4$, $CO_2$/$N_2$, $H_2$/$CH_4$, $O_2$/$N_2$, olefin/paraffin, iso/normal paraffins separations, and other light gas mixture separations.

Liu 242 uses a polymer matrix made from one or more polyimides (e.g., Ultem® or Matrimid® poly(ether)imides, respectively from GE Plastics and Huntsman Advanced Materials) which have at most a single methylene group separating an aromatic and/or conjugated polymer backbone, but discloses that the polymer may be selected from a vast array of polymers with an equally vast array of inorganic or organic fillers. Liu 242 reports that for 50% AlPO-14/poly(3,3',4,4'benzophenone tetracarboxylic dianhydride-3,3',5,5'-tetramethyl-4,4'-methylene dianiline, i.e., poly(DSDA-TMMDA), a mixed matrix dense film without surface functionalization by PES polymer, the selectivity decreased by 47% compared to that of the "control" poly (DSDA-TMMDA) polymer. However, the functionalized AlPO-14/PES/poly(DSDA-TMMDA) mixed matrix showed a consistent increase in both $CO_2$ permeability (by 80%) and $CO_2$/$CH_4$ selectivity (65%) at loading of 0.5 (50% AlPO-14/PES/poly(DSDA-TMMDA)) compared to the "control" poly(DSDA-TMMDA). Liu neither particularly selects a polyamide membrane, nor a polysulfone membrane, nor a multi-layered membrane with each of these, nor the use of a CDC filler in such a matrix.

U.S. Pat. No. 6,503,295 to Koros et al. (Koros 295) describes mixed matrix membranes capable of separating carbon dioxide from mixtures including carbon dioxide and methane, and processes for purifying methane using the membranes. Koros 295's membranes are preferably polymer membranes that include discrete carbon-based molecular sieve particles with sizes of between about 0.5 microns to about 5.0 microns. Koros 295's particles are formed by pyrolyzing a precursor polymer in the form of a powder or film. Koros 295's pyrolyzed polymer is then milled to desired small size particles, in a preferred ratio of particles to polymer of about 0.25 to about 1.0 by volume. A preferred method for preparing the mixed matrix membrane is by dispersing the particles in a solvent, adding a small quantity of the desired polymer or "sizing agent" to "size" or "prime" the particles, adding a polymer, casting a film of the polymer solution, and evaporating the solvent to form a mixed matrix membrane film. The mixed matrix membrane film permits passage of carbon dioxide and methane, but at different permeation rates, such that the ratio of the relative permeation rates of carbon dioxide to methane is larger through the mixed matrix membrane film than through the original polymer. The mixed matrix membrane is preferably in the form of a dense film or a hollow fiber. A mixture containing carbon dioxide and methane can be enriched in methane by selective passage of carbon dioxide over methane in a gas-phase process through the membrane U.S. Pat. No. 6,585,802 to Koros et al. (Koros 802) discloses a matrix polymer membranes capable of separating carbon dioxide from mixtures including carbon dioxide and methane, and processes for purifying methane using the membranes include a selective layer thickness of between about 1000 Angstroms to about 0.005 inch, that include discrete carbon-based molecular sieve particles with sizes of between about 0.5 microns to about 5.0 microns. Koros 802's particles are formed by pyrolyzing a precursor polymer in the form of a powder or film. Koros 802's pyrolyzed polymer is then milled to desired small size particles. Koros 802's preferred ratio of particles to polymer is about 0.25 to about 1.0 by volume. Koros 802's preferred method for preparing the mixed matrix membrane is by dispersing the particles in a solvent, adding a small quantity of the desired polymer, or "sizing agent" to "size" or "prime" the particles, adding a polymer, casting a film of the polymer solution, and evaporating the solvent to form a mixed matrix membrane film, preferably in the form of a dense film or a hollow fiber. Koros 802's polymer is preferably a rigid, glassy polymer, more preferably, with a glass transition temperature above about 150° C.

Koros 295 and Koros 802 describe that a practically unlimited selection of polymers is useful for its matrix, limited only by diffusion properties and preferring (esp. Ultrem® and Matrimid®) polyimides, with these polymers being pyrolyzed along with carbon molecular sieves (CMSs), i.e., milled particles of polyimides, polyamides, cellulose and derivatives thereof, thermosetting polymers, acrylics, pitch-tar mesophase, and the like (though Koros does not limit the CMS materials to these). Neither Koros reference discloses particularly selecting a polyamide membrane, nor a polysulfone membrane, nor a multi-layered membrane with each of these, nor the use of a CDC filler in such a matrix. Moreover, these references require pyrolyzing the polymeric matrix.

Accordingly, there remains a need for improved membranes and methods for separating gases, especially $CO_2$ from hydrocarbon gas mixtures.

SUMMARY OF THE INVENTION

Aspects of the invention provide multilayered membrane(s), comprising: a first layer, comprising at least 50 wt. % sulfone-containing polymer; a second layer, comprising at least 50 wt. % polyamide comprising, in condensation polymerized form, an aliphatic diamine and an aromatic dicarboxylate; and SiC, $Fe_3C$, WC, $Ti_3SiC_2$, ZrC, $B_4C$, TaC, $Mo_2C$, and/or TiC-derived carbon (CDC) nanoparticles embedded in the second layer in an amount in a range of from 0.005 to 1.0 wt. %, based on a total weight of the second layer, wherein the first layer directly contacts the second layer. Such membranes may have any permutation of the features described herein.

The second layer may comprise the CDC nanoparticles in a range of from 0.01 to 0.9 wt. %. Additionally or alternatively, the CDC nanoparticles in the second layer may comprise TiC-derived CDC nanoparticles.

Inventive membrane may comprise a further polyamide-comprising layer comprising the CDC nanoparticles.

The CDC nanoparticles may be prepared by a method comprising: (i) heating titanium carbide and chlorine gas at temperature in a range of from 600 to 1000° C. for a period in a range of from 2 to 6 hours; (ii) replacing the chlorine gas with hydrogen gas at within 100° C. of the heating in (i); and (iii) replacing the hydrogen gas with inert gas and cooling.

The diamine may be a cyclic diamine. For example, the diamine may comprise a piperazine, 4-aminopiperidine, 3-aminopyrrolidine, 1,4-diaminocyclohexane, 1,4-diaminomethylene-cyclohexane, 1,4-diazacycloheptane, 1,5-diazocane, hexahydropyrrolo[3,4-c]pyrrole, hexahydropyrrolo[3,4-b]pyrrole, 3,7-diaza-bicyclo[3.3.1]nonane, 2,5-diazabicyclo[2.2.2]octane, 3,8-diazabicyclo[3.2.1]octane, 2,5-diazabicyclo[2.2.1]heptane, ethylenediamine, 1,3-diaminopropane, 1,4-butanediamine, 1,5-pentanediamine, or a mixture of two or more of these. The diamine may comprise at least 75 wt. %, relative to total diamine, unsubstituted piperazine.

The dicarboxylate may comprise a 1,3-benzenedicarboxylate (isophthalate), 1,4-benzenedicarboxylate (terephthalate), 1,2-benzenedicarboxylate (phthalate), 2,6-naphthalenedicarboxylate, 2,3-naphthalenedicarboxylate, 1,4-naphthalenedicarboxylate, 1,5-naphthalenedicarboxylate, 1,7-naphthalenedicarboxylate, 1,2,3,4-tetrahydro-1,4-naphthalenedicarboxylate, 2,6-pyridinedicarboxylate (dipicolinic acid), 2,5-pyridinedicarboxylate (isocinchomeronic acid), 1H-pyrrole-2,4-dicarboxylate, or a mixture of two or more of any of these. The dicarboxylate may comprise at least 75 wt. %, relative to total dicarboxylate, 1,3-benzenedicarboxylate with no further substituents.

The sulfone-containing polymer may have a structure (I), (II), (III), (IV), and/or (V), as follows: -(—Ar—SO2-)n- (I), -(—Ar'—SO2—Ar"—O—)n- (II), -(—YAr—SO$_2$-)n- (III), wherein Ar, Ar', and Ar" are independently aromatic residues, Y and Z are independently aliphatic, cycloaliphatic, aromatic, or heterocyclic residues, and n is in a range of from 100 to 100,000.

The sulfone-containing polymer may have a structure PSU, PES, PAS, PPSU, and/or PSF:

The sulfone-containing polymer may preferably be PSF and/or may preferably have a $M_w$ in a range of from 10,000 to 50,000.

Aspects of the invention may provide gas filter(s) and/or gas treatment apparatus(es), comprising any permutation of the inventive membrane(s) as described herein.

Aspects of the invention may provide method(s), comprising: passing a gas mixture, comprising $CO_2$ and a further gas, through any permutation of the inventive membrane(s) as described herein, thereby enriching a $CO_2$ in an effluent gas mixture from the membrane. The further gas may be methane.

Aspects of the invention may provide method(s) of preparing a mixed matrix membrane, e.g., any permutation of the inventive membrane(s) as described above, the method(s) comprising: (a) combining a sulfone-containing polymer with a polar aprotic solvent, to obtain a first mixture; (b) mixing an alcohol with the first mixture, to obtain a second mixture; (c) casting the second mixture onto a surface to create a layer with a thickness in a range of from 100 to 400 µm; (d) drying the layer, to obtain a dried layer; (e) polymerizing, on the dried layer, a composition comprising an aliphatic diamine, an aromatic dicarboxylate, and SiC, $Fe_3C$, WC, $Ti_3SiC_2$, ZrC, $B_4C$, TaC, $Mo_2C$, and/or TiC-derived carbon (CDC) nanoparticles, to obtain the mixed matrix membrane comprising a CDC-doped polyamide layer upon a sulfone-containing polymer layer. Inventive methods may further comprise: (f) repeating the polymerization so as to obtain two or more polyamide layers on the membrane.

The polar aprotic solvent may comprise dimethyl formamide, dimethyl acetamide, N-methylpyrrolidone, tetrahydrofuran, dimethyl sulfoxide, ethyl acetate, 1,4-dioxane, nitromethane, dichloromethane, chloroform, acetonitrile, and/or acetone.

The polymerizing (e) may comprise: (i) contacting the dried layer a third mixture comprising the diamine, to give an amine-treated layer; and (ii) agitating the amine-treated layer a fourth mixture comprising the aromatic dicarboxylate and the CDC nanoparticles.

In the inventive methods, the third mixture may comprise from 0.5 to 5.0% (w/v) piperazine and water, and/or the fourth mixture may comprises from 0.05 to 0.5 (w/v) isophthaloyl chloride or isophthaloyl anhydride and hexane, and/or the CDC nanoparticles may be present in an amount of from 0.001 to 1.0 wt. %.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION OF THE PREFERRED EMBODIMENTS

Aspects of the invention provide multilayered membrane(s), comprising: a first layer, comprising at least 50, 75, 85, 90, 95, 97.5, 99, 99.9, 99.99 wt. % or even exclusively, relative to the polymers in the first layer, one or more sulfone-containing polymers; a second layer, comprising at least 50, 60, 65, 75, 85, 90, 95, 97.5, 99, 99.9, 99.99 wt. % or even exclusively, relative to the polymers in the second layer, one or more polyamide polymers comprising, in condensation polymerized form, an aliphatic diamine and an aromatic dicarboxylate; and SiC, $Fe_3C$, WC, $Ti_3SiC_2$, ZrC, $B_4C$, TaC, $Mo_2C$, and/or TiC-derived carbon (CDC) nanoparticles, preferably TiC-derived nanoparticles, embedded in the second layer in an amount in a range of from, e.g., 0.001 to 1.0, 0.005 to 0.9, 0.01 to 0.8, or 0.025 to 0.75 wt. %, based on a total weight of the second layer, wherein the first layer directly contacts the second layer.

As referred to herein, carbide-derived carbon (CDC) materials are generally tunable nanoporous carbons derived from carbides. A large family of CDC materials can be prepared from any metal carbide, such as SiC, TiC, $B_4C$, $Ti_3SiC_2$, WC, $Mo_2C$, $Fe_3C$, etc., or mixtures thereof, by selective removal of the metal atom using a halogen gas at elevated temperature (200 to 1200° C.). For example, the synthesis of CDC from TiC powder can be explained by the chemical reaction shown in Equation 1, below:

$$2TiC(s)+3Cl_2(g) \rightarrow 2TiCl_3(g)+2C(s) \qquad \text{Eq. 1.}$$

CDC particles generally have a surface area per unit mass, i.e., specific surface area (SSA), in a range from 1000 to 3000 m²/g, and have a tunable pore size (0.5 to 3 nm), pore shape, surface chemistry, and SSA, e.g., by changing the synthetic conditions, composition, and structure of the carbide precursor. Relevant SSAs could be at least 800, 900, 1000, 1200, 1250, 1300, 1500, 1750, 2000, or 2500 m²/g and/or up to 4500, 4000, 3500, 3250, 3000, 2750, 2500, 2250, 2000, or 1800 m²/g.

The CDC nanoparticles may preferably be TiC-derived for particular applications, e.g., gas treatment, and/or may preferably be present in the second layer at any of the previously discussed endpoints, and/or at least 0.0001, 0.0005, 0.0025, 0.0033, 0.0067, 0.0125, 0.015, 0.0175, 0.02, 0.03, 0.033, 0.04, 0.06, 0.075, 0.1, 0.125, 0.15, 0.175, 0.2, 0.225, 0.25, 0.275, 0.3, 0.325, 0.333, 0.35, 0.375, or 0.4 wt. %, and/or no more than 1.2, 1.1, 1.05, 0.975, 0.95, 0.925, 0.9, 0.875, 0.85, 0.825, 0.8, 0.775, 0.75, 0.725, 0.7, 0.675, or 0.667 wt. % CDC nanoparticles, whereby any of these endpoints may be upper or lower ends of ranges depending upon the circumstances For certain gas separation/enriching applications, as disclosed herein, unexpectedly superior membrane performance may be obtained with ranges of CDC nanoparticles in a polyamide layer, e.g., the second layer, in a range of from 0.01 to 0.9, 0.02 to 0.875, 0.05 to 0.85, 0.1 to 0.825, or even 0.2 to 0.8 wt. %, based on a total weight of the second (or polyamide-comprising) layer. Additionally or alternatively, the CDC nanoparticles in the second layer may comprise at least 75, 80, 85, 90, 91, 92, 92.5, 93, 94, 95, 96, 97, 97.5, 98, 99, 99.1, 99.5, or 99.9 wt. % of TiC-derived CDC nanoparticles, relative to a total weight of the CDC nanoparticles in the layer. In the event of several polyamide layers, the CDC nanoparticles embedded may be the same from layer to layer, or may vary randomly, or may vary in a pattern, e.g., (a) $CDC_1$ (e.g., TiC-derived), $CDC_2$ (e.g., WC-derived), $CDC_1$, $CDC_2$, $CDC_1$, $CDC_2$, ...; (b) $CDC_1$, $CDC_2$, $CDC_3$ (e.g., SiC-derived), ...; (c) $CDC_1$, $CDC_2$, $CDC_3$, $CDC_1$, $CDC_2$, $CDC_3$, $CDC_1$, $CDC_2$, $CDC_3$, ...; (d) $CDC_1$, $CDC_2$, $CDC_1$, $CDC_3$, $CDC_1$, $CDC_2$, ...; (e) $CDC_1$, $CDC_2$, $CDC_1$, $CDC_3$, $CDC_1$, $CDC_4$, ...; (f) $CDC_1$, $CDC_2$, $CDC_3$, $CDC_2$, $CDC_3$, $CDC_4$, $CDC_3$, $CDC_4$, $CDC_5$, ...; (g) $CDC_1$, $CDC_2$, $CDC_3$, ... $CDC_3$, $CDC_2$, $CDC_1$, or the like.

The inventive membrane may comprise a further polyamide-comprising layer comprising the CDC nanoparticles, for example membranes may contain 1, 2, 3, 4, 5, 6, 7, 8, 9, 10, 15, 20 or more polyamide-containing layers. The membranes may contain 1, 2, 3 or more sulfone-containing polymer layers, though generally no more than the polyamide layer(s).

The CDC nanoparticles may be prepared by a method comprising: (i) heating titanium carbide, or any other carbide or combination of carbides used, and chlorine gas at temperature in a range of from 600 to 1000° C. for a time period in a range of from 2 to 6 hours; (ii) replacing the chlorine gas with hydrogen gas at within 100° C. of the heating in (i); and (iii) replacing the hydrogen gas with inert gas and cooling. In place of, or in addition to, the $Cl_2$ gas, a further halogen gas or gas mixture may be used, e.g., $F_2$, vaporized and/or liquid $Br_2$, and/or vaporized, solid, and/or liquid $I_2$. The temperature may vary, e.g., based on a gradient, or may be fixed, e.g., around 600, 650, 675, 700, 725, 750, 775, 800, 825, 850, 875, or 900° C. The time period of heat treatment may be at least 1 hour and over a range of 1, 2, 3, 4, 5, 6, or 7 hours, although the heat treatment may be limited to 5, 4, 3.5, or 3 hours.

The diamine may be a cyclic diamine. For example, the diamine may comprise a piperazine, 4-aminopiperidine, 3-aminopyrrolidine, 1,4-diaminocyclohexane, 1,4-diaminomethylene-cyclohexane, 1,4-diazacycloheptane, 1,5-diazocane, hexahydropyrrolo[3,4-c]pyrrole, hexahydropyrrolo[3,4-b]pyrrole, 3,7-diaza-bicyclo[3.3.1]nonane, 2,5-diazabicyclo[2.2.2]octane, 3,8-diazabicyclo[3.2.1]octane, 2,5-diazabicyclo[2.2.1]heptane, ethylenediamine, 1,3-diaminopropane, 1,4-butanediamine, 1,5-pentanediamine, or a mixture of two or more of these. The diamine may comprise at least 75, 80, 85, 90, 92.5, 95, 97.5, 98, 99, 99.9, or 99.99 wt. %, relative to total diamine, unsubstituted piperazine. The polyamide may contain, in polymerized form, no further monomers than the sole diamine (or diamines) and/or sole dicarbonyl compound (or dicarbonyls) than 7.5, 7, 6, 5, 4, 3, 2.5, 2, 1, or 0.5 wt. %.

The dicarboxylate may comprise a 1,3-benzenedicarboxylate (isophthalate), 1,4-benzenedicarboxylate (terephthalate), 1,2-benzenedicarboxylate (phthalate), 2,6-naphthalenedicarboxylate, 2,3-naphthalenedicarboxylate, 1,4-naphthalenedicarboxylate, 1,5-naphthalenedicarboxylate, 1,7-naphthalenedicarboxylate, 1,2,3,4-tetrahydro-1,4-naphthalenedicarboxylate, 2,6-pyridinedicarboxylate (dipicolinic acid), 2,5-pyridinedicarboxylate (isocinchomeronic acid), 1H-pyrrole-2,4-dicarboxylate, or a mixture of two or more of any of these. The dicarboxylate may comprise at least 75, 80, 85, 90, 92.5, 95, 97.5, 98, 99, 99.9, or 99.99 wt. %, relative to total dicarboxylate, 1,3-benzenedicarboxylate with no further substituents. The dicarboxylate may have no more than 25, 20, 15, 10, 5, 4, 3, 2, 1, 0.5, 0.1, 0.001, or 0.0001 wt. % or no more than trace detectable amounts of tricarboxylate compound(s), such as triacid halides or trianhydrides.

The sulfone-containing polymer may have a structure (I), (II), (III), (IV), and/or (V), as follows: -(—Ar—$SO_2$-$)_n$- (I), -(—Ar'—$SO_2$—Ar"—O—$)_n$- (II), -(—YAr—$SO_2$-$)_n$- (III), wherein Ar, Ar', and Ar" are independently substituted or unsubstituted aromatic residues, such as phenylene, naphthylene, anthracenyl, biphenylene, or the like, Y and Z are independently aliphatic, such as methylene, ethylene, propylene, or other C4-C8 alkyl residues, etc., cycloaliphatic, such as 5, 6, 7, 8 and 10-membered rings, substituted or unsubstituted aromatic groups, such as phenylene, naphthylene, biphenylene, or the like, or heterocyclic residues, such as 5, 6, 7, 8 and 10-membered rings, including substituents such as such as methylene, ethylene, propylene, or other C4-C8 alkyl residues, etc., and/or heteroatoms such as nitrogen, sulfur, and/or oxygen, and n is in a range of from 100 to 100,000, 150 to 75,000, 200 to 50,000, 250 to 40,000, 300 to 30,000, 400 to 20,000, 500 to 10,000, 750 to 7,500, or 1,000 to 5,000. Examples of useful sulfone-containing polymers can be found in Parodi, Fabrizio, "Polysulfones," Ch. 33 in *Comprehensive Polymer Science and Supplements*, Vol. 5, 1989, pp 561-591, which is incorporated by reference herein in its entirety.

The sulfone-containing polymer may have one or more repeating units of structure PSU, PES, PAS, PPSU, and/or PSF:

(PSU)

(PES)

(PAS)

(PPSU)

(PSF)

The sulfone-containing polymer may preferably be PSF and/or may preferably have an $M_w$ in a range of from 10,000 to 50,000, 15,000 to 45,000, 20,000 to 40,000, 25,000 to 35,000, or 27,500 to 32,500. The sulfone-containing polymer may alternatively or further have an $M_n$ in a range of from 10,000 to 25,000, 12,000 to 20,000, or 14,000 to 18,000, and/or the PDI may be in a range of 1.5 to 10, 1.6 to 8, 1.75 to 6, or 1.9 to 4.

Aspects of the invention may provide gas filter(s) and/or gas treatment apparatus(es), comprising any permutation of the inventive membrane(s) as described herein. Such filters or apparatuses may contain 1, 2, 3, 5, 10, 20, 50, 100, 250, 500, or more such inventive membranes. The surface area covered by the filters may vary by application, but may be at least 0.01, 0.05, 0.075, 0.1, 0.25, 0.5, 1, 2.5, 5, 7.5, 10, 15, 25, 50, 100, or 250 m$^2$, and/or no more than 1000, 500, 250, 125, 75, 40, 20, 10, 5, 1, 0.1, or 0.01 m$^2$.

Aspects of the invention may provide method(s), comprising: passing a gas mixture, comprising $CO_2$ and a further gas, through any permutation of the inventive membrane(s) as described herein, thereby enriching a $CO_2$ in an effluent gas mixture from the membrane. The further gas may be methane, ethane, ethylene, ethylene oxide, acetylene, propane, propylene, isobutene, isobutene, 1-butene, 2-butene, butane, and/or butadiene. The gas mixture may comprise 2, 3, 4, 5, 6, 7, 10 or more gases. The gas mixture may be an exhaust or syngas or PSA by-product. The gas mixture may be a refined and/or purified gas mixture.

Aspects of the invention may provide method(s) of preparing a mixed matrix membrane, e.g., any permutation of the inventive membrane(s) as described above, the method(s) comprising: (a) combining a sulfone-containing polymer with a polar aprotic solvent, to obtain a first mixture; (b) mixing an alcohol with the first mixture, to obtain a second mixture; (c) casting the second mixture onto a surface to create a layer with a thickness in a range of from 100 to 400 μm; (d) drying the layer, to obtain a dried layer; (e) polymerizing, on the dried layer, a composition comprising an aliphatic diamine, an aromatic dicarboxylate, and SiC, Fe$_3$C, WC, Ti$_3$SiC$_2$, ZrC, B$_4$C, TaC, Mo$_2$C, and/or TiC-derived carbon (CDC) nanoparticles, to obtain the mixed matrix membrane comprising a CDC-doped polyamide layer upon a sulfone-containing polymer layer. Inventive methods may further comprise: (f) repeating the polymerization so as to obtain two or more polyamide layers on the membrane. Sulfone-containing polymer layers within the scope of the invention may have a thickness in a range of from 50 to 1000, 100 to 500, 125 to 400, 150 to 300, or 175 to 250 μm, and/or the polyamide containing layer(s) may have thicknesses of no more than 500, 400, 300, 250, 225, 200, 175, 150, 125, 100, 75, 50, or 25 μm. The polyamide containing layers may generally be thinner than the sulfone-containing polymer layer.

The polar aprotic solvent may comprise dimethyl formamide, dimethyl acetamide, N-methylpyrrolidone, tetrahydrofuran, dimethyl sulfoxide, ethyl acetate, 1,4-dioxane, nitromethane, dichloromethane, chloroform, acetonitrile, and/or acetone. The polar, aprotic solvent may preferably include dimethyl acetamide and THF.

The polymerization (e) may comprise: (i) contacting the dried layer with a third mixture (preferably aqueous) comprising the diamine, to give an amine-treated layer; and (ii) agitating or contacting the amine-treated layer with a fourth mixture (preferably in an organic solvent such as hexane) comprising the aromatic dicarboxylate and the CDC nanoparticles.

In the inventive methods, the third mixture may comprise from 0.5 to 5.0, 1.0 to 4.0, 1.5 to 3.5, 1.75 to 3.0, or 2 to 2.5% (w/v) diamine, e.g., piperazine, and water or similar polar solvent, and/or the fourth mixture may comprises from 0.05 to 0.5, 0.1 to 0.4, 0.15 to 0.3, or 1.75 to 0.25% (w/v) dicarbonyl compound, e.g., isophthaloyl chloride or isophthaloyl anhydride, and hexane or similar solvent(s), and/or the CDC nanoparticles may be present in an amount of from 0.001 to 1.0 wt. % (or any percentage range discussed above). Hexane, as a solvent, may be substituted by, or supplemented with butane, pentane, cyclohexane, heptane(s), octane(s), decalin, diethyl ether, diisopropyl ether, and/or additive-free gasoline. The diamine may be in water and/or methanol in varying proportions or any solvent to create a phase separation with the solvent of the carbonyl compound and sufficient to dissolve the diamine.

Inventive membranes need not, but may as desired, exclude polyester layers and/or contain no more than 25, 20, 15, 10, 5, 4, 3, 2, 1, 0.5, 0.1, 0.001, or 0.0001 wt. %, relative to total weight, or no more than trace detectable amounts of polyesters. The second (polyamide-containing) layer generally contain less than 15, 10, 7.5, 5, 2.5, 2, 1, 0.1, 0.01, 0.001, or 0.0001 wt. %, relative to polymer content of each layer, vinylidene fluoride (VDF), tetrafluoroethylene (TFE), ethylenetetrafluoroethylene (ETFE), perfluoroalkoxyalkane to (PFA), vinylfluoride (VF), chlorotrifluoroethylene (CTFE), fluorinated ethylene propylene (FEP), hexafluoropropylene (HFP), perfluoro (propyl vinylether), polyethylene, polypropylene, polysulfone, polyketone, polyethersulfone, cellulose, cellulose acetate, cellulose triacetate, regenerative cellulose, acryl resin, epoxy, and/or polyimide-based (co)polymers. Inventive membranes generally contain less than 15, 10, 7.5, 5, 2.5, 2, 1, 0.1, 0.01, 0.001, or 0.0001 wt. % polyimide. Additionally, or separately, the doped layers may contain no more than 25, 20, 15, 10, 5, 4, 3, 2, 1, 0.5, 0.1, 0.001, or 0.0001 wt. % or no more than trace detectable amounts of zeolites, titanium oxide, (fumed) silica, silicon carbide, silicon nitride, spinel, silicon oxycarbide, glass powder, glass fiber, carbon fiber, graphene, nanotubes, gold microparticles, silver microparticles, alumina, magnesia, silicon nitride, zirconia, zirconium carbide, sialon, nasicon, silceram, mullite, aluminum, copper, nickel, steel, titanium, titanium carbide, and titanium diboride, SiC, WC, $Fe_3C$, ZrC, B4C, TaC, $Mo_2C$, and/or $Ti_3SiC_2$. Inventive polyamides may contain no more than 25, 20, 15, 10, 5, 4, 3, 2, 1, 0.5, 0.1, 0.001, or 0.0001 wt. % or no more than trace detectable amounts of tricarbonyl and/or tetracarbonyl compounds. Inventive polyamides may contain no more than 25, 20, 15, 10, 5, 4, 3, 2, 1, 0.5, 0.1, 0.001, or 0.0001 wt. % or no more than trace detectable amounts of triamine and/or tetraamine compounds.

EXAMPLES

Carbide-derived carbon (CDC)/polyamide film(s) on top of a polysulfone (PSF) support were prepared to study the merits of such membranes for $CO_2$ separation from $CH_4$. The membranes produced, as well as CDCs nanoparticles, were characterized by SEM, FT-IR, TGA, and XRD. $CO_2$ and $CH_4$ permeation were tested for the membranes using the established constant volume/variable pressure method. Gas permeation measurements of the membranes demonstrated 88.14% enhancement in $CO_2$ permeance and 49.35% improved $CO_2/CH_4$ selectivity compared to pure polyamide on PSF membranes. A Netzsch model STA 449 F345 Jupiter® TGA device was used to check the thermal stability/degradation behavior of the membranes and components.

Titanium carbide nano-powder (cubic TiC, 99+%, 40-60 nm) was purchased from US Research nanomaterials, Inc., USA. Polysulfone (average MW~35,000) and dimethyl acetamide (DMAc) were purchased from Sigma-Aldrich, USA, and n-hexane was purchased from Fisher Scientific Canada.

Synthesis of CDC nanoparticles: titanium carbide (which may be substituted by, or supplemented with, any metal carbide described herein or otherwise known in the art) in quartz boat was inserted in a quartz tubular furnace and heated at a rate of 10° C./min to the desired temperature while continuously purging with argon to create air-free and oxygen-free, closed system. The atmosphere may desirably contain less than 15, 10, 7.5, 5, 2.5, 2, 1, 0.1, 0.01, 0.001, 0.0001, or 0.00001 vol. % $O_2$, based on the amount of all gases in the atmosphere. The heating rate may be anywhere in a range of from 1 to 50, 2 to 40, 3 to 30, 5 to 25, 7.5 to 15, or 8 to 12° C./min. When the furnace temperature reached the desired set point of 700, 800, or 900° C., pure chlorine gas was introduced at a flow rate of 10 to 13 $cm^3$/min for 3 hours. After chlorination, a post-treatment was carried out with hydrogen gas at the same final temperature, i.e., 700, 800, or 900° C., for one hour to remove the remaining chlorine from the CDC which will enhance the SSA and micro-pore volume of the nanoparticles. Useful temperatures may be in a range of from 200 to 1200, 400 to 1100, 500 to 1000, or 600 to 900° C., e.g., any of these endpoints or at least 300, 450, 550, 650, 675, 725, 750, 775, 825, or 850° C., and/or no more than 1150, 1050, 1025, 975, 950, 925, 875, 850, or 825° C. Then the furnace was purged with argon gas to cool it down to ambient temperature.

Membranes Preparation—Polysulfone Support: a polysulfone (PSF) support was fabricated by dry/wet phase inversion technique. Prior to membrane preparation, commercially available PSF polymer pellets were dried overnight at 100° C. in a vacuum oven in order to completely remove the moisture from the polymer. Dry PSF pellets were dissolved in a mixture of DMAC and THF, then ethanol was added and the solution, which was stirred for 24 hours at 25° C. using a magnetic stirrer. The polymeric solution, having a composition shown in Table 1, below, was then degassed at room temperature for 24 hours to remove dissolved gases/air bubbles. After that, the solution was cast on a clean glass plate to a thickness of 200 µm using a casting knife. The membrane was left in air for 60 seconds under ambient condition and subsequently immersed in a deionized (DI) water bath for 24 hours. The membranes were immersed in methanol for 2 hours for solvent-exchange and treated with polydimethylsiloxane (3% in hexane) to eliminate infinitesimal defects or pinholes in the membrane and then finally dried in vacuum oven at100° C. for 48 hours.

TABLE 1

| Composition and amount of the dope solution | | |
|---|---|---|
| Component | Amount (g) | Concentration (%) |
| PSF Pellets | 4.00 | 23.03 |
| DMAC | 5.81 | 33.45 |
| THF | 5.81 | 33.45 |
| Ethanol | 1.75 | 10.07 |

Membranes Preparation—Preparation of Polyamide (PA) and CDC/PA Mixed Matrix Membranes (MMMs): a polyamide membrane was prepared by interfacial polymerization, whereby polymerization occurs between a diamine—here piperazine in deionized water—and an activated carbonyl compound (e.g., acid halide, such as acid chloride or acid bromide, or acid anhydride)—here isophthaloyl chloride in hexane. The previously prepared PSF layer was saturated with the 2% (w/v) piperazine solution for 10 minutes, then a rubber roller was used to remove the excess piperazine solution. Subsequently, the PSF support layer was immersed in the 0.2% (w/v) isophthaloyl chloride solution for 3 minutes, then the excess unreacted isophthaloyl chloride was removed using pure hexane. Finally, the membranes were cured/dried at 80° C. for 10 min, and the polyamide-polysulfone membranes were kept in DI water. For thin film nanocomposite (TFN) membranes, CDCs nanoparticles were incorporated into the polyamide layer during interfacial polymerization reaction by adding the desired amount of nanoparticles, shown in Table 2, to 100 mL of the isophthaloyl chloride solution, then the CDC-doped isophthaloyl chloride solution was sonicated for 15 minutes using probe sonicator for 1 hour in a bath sonicator.

TABLE 2

List of membrane Codes and Composition of the prepared TFN membranes

| Membrane code | Description |
|---|---|
| MMM0 (Control PA) | Pure polyamide membrane without CDC nanoparticles. This membrane was used as the control sample with which, the performance of other membranes were compared |
| MMM1 | Mixed matrix membrane comprises polyamide and 0.0005% CDC nanoparticles |
| MMM2 | Mixed matrix membrane comprises polyamide and 0.002% CDC nanoparticles |
| MMM3 | Mixed matrix membrane comprises polyamide and 0.1% CDC nanoparticles |
| MMM4 | Mixed matrix membrane comprises polyamide and 0.5% CDC nanoparticles |
| MMM5 | Mixed matrix membrane comprises polyamide and 1% CDC nanoparticles |

After sonication, the interfacial polymerization was conducted as above. To synthesize a layer-by-layer membrane structure, the interfacial polymerization can be repeated with multiple reactions between the same monomers, each time after drying/curing. For each complete cycle of interfacial polymerization and curing/drying, the membrane can be considered to include one additional deposited (optionally doped polyamide) layer. It is also possible to vary doped and undoped layers in any pattern as discussed above.

Gas Permeation Measurements: The permeance of the fabricated membranes was examined using pure $CO_2$ and $CH_4$ gases. The membranes were tested at different feed pressures from 1 to 5 bar and temperatures from 300 to 323K. Gas permeation experiments were conducted using the well-known constant volume/variable pressure (time-lag) method.

Referring now to the drawings, wherein like reference numerals designate identical or corresponding parts throughout the several views.

Figure 1:
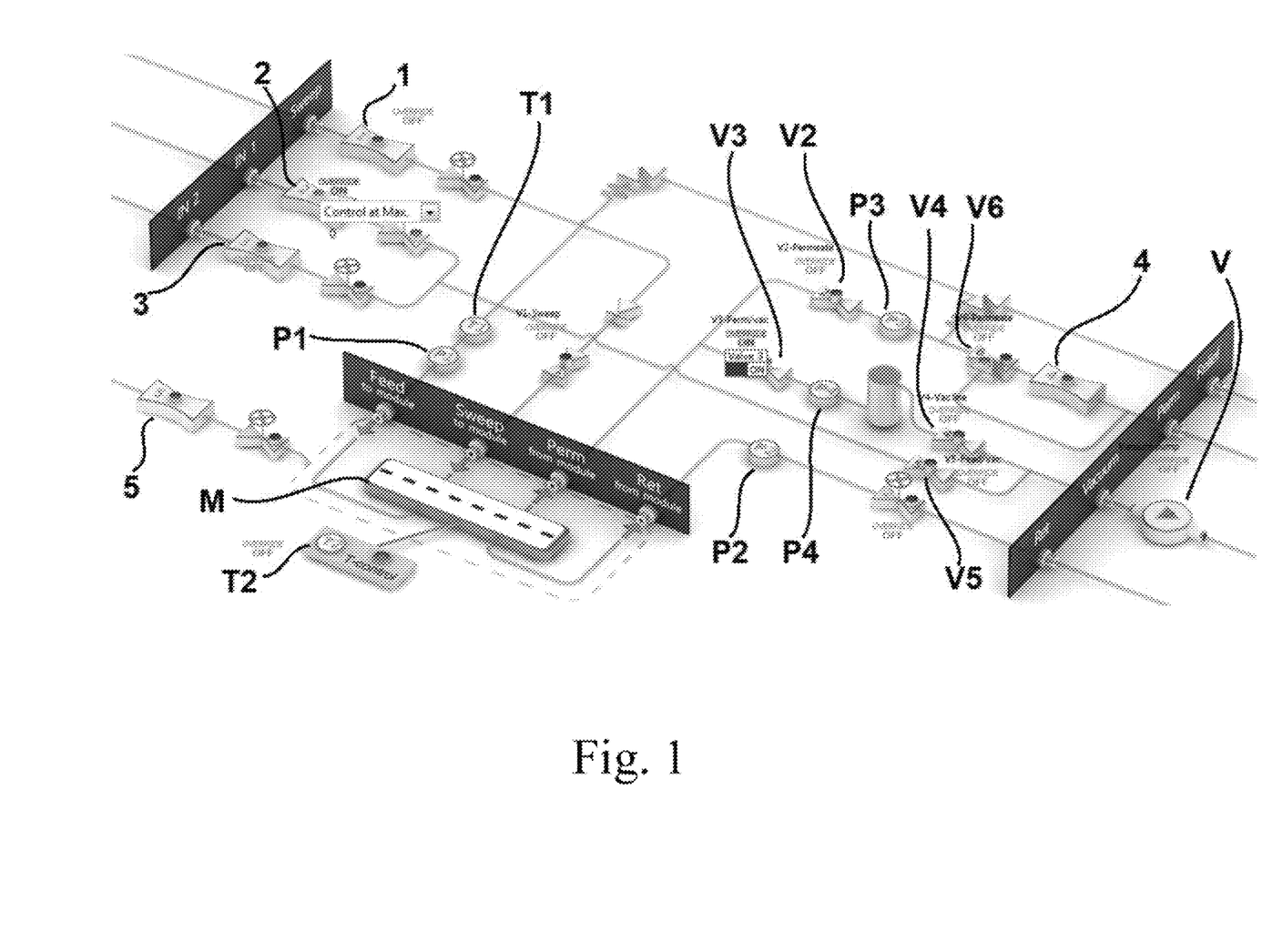
FIG. 1 shows a flow sheet of the setup used in the permeation experiments described herein.

As shown in FIG. 1, the gas permeation setup was built to work in two modes, constant volume/variable pressure and constant pressure/variable volume. The system contains three Bronkhorst Coriolis mass flow controllers, a membrane module (M), a permeation volume, a vacuum pump (V) that is connected to the permeate volume (V2 to V5), and pressure transducers (P1, P2, P3, P4) to detect the feed and permeate pressures. The process is controlled by software and the data is collected by LabVIEW. A membrane sample with an effective area of 4.91 cm² was cut and fixed inside the membrane cell, and both sides of the membrane module were evacuated to a pressure of less than 1 mbar. The gas was then fed into the module at a constant pressure. To determine the gas permeation, the valve (V4) used for the evacuation was closed and the pressure change in the permeate side was monitored with time. The leak rate was measured at the start of each experiment to get accurate permeation rate and the data reported here is the average of at least two independent measurements. The permeance (p) was calculated in gas permeation units (1 GPU=$10^{-6}$ cm³ (STP)/(s cm² cm-Hg)) using Eq. (1):

$$p = \frac{273.15 \times 10^6 \, V_d}{760 \left(P_2 \times \frac{76}{1407}\right) A \, T} \left[\left(\frac{dP_1}{dt}\right)_{ss} - \left(\frac{dP_1}{dt}\right)_{leak}\right], \quad (1)$$

where $V_d$ is the downstream volume (cm³), A is the effective membrane area (cm²), $P_2$ is the upstream pressure (mm Hg), and $(dP_1/dt)_{ss}$ is the rate of pressure change in the downstream chamber at the steady state in (mm Hg/s), and $(dP_1/dt)_{leak}$ is the leak rate in (mm Hg/s), T is the cell temperature in K. The selectivity of gas i to j ($\alpha_{ij}$) can be estimated by Eq. (2):

$$\alpha_{ij} = \frac{p_i}{p_j}. \quad (2)$$

SEM images of polysulfone membrane are shown in FIG. 2. The images were made using a MIRA3 Field Emission Scanning Electron microscope (FE-SEM) from TESCAN, with an increasing electron voltage of 15 KV. A gold layer of 10 nm thickness was used for samples coating using Ion Sputter Q 150R S (Quorum Technologies). The highly porous PSF surface, seen in FIG. 2A, was observed for membranes prepared by a conventional wet phase inversion method. These membranes showed very low gas selectivity. Therefore, a convective air evaporation period was applied to the membranes before coagulation in a DI water bath, which resulted in an asymmetric PSF structure with a top dense layer, as can be seen in FIG. 2B.

Figure 2A:
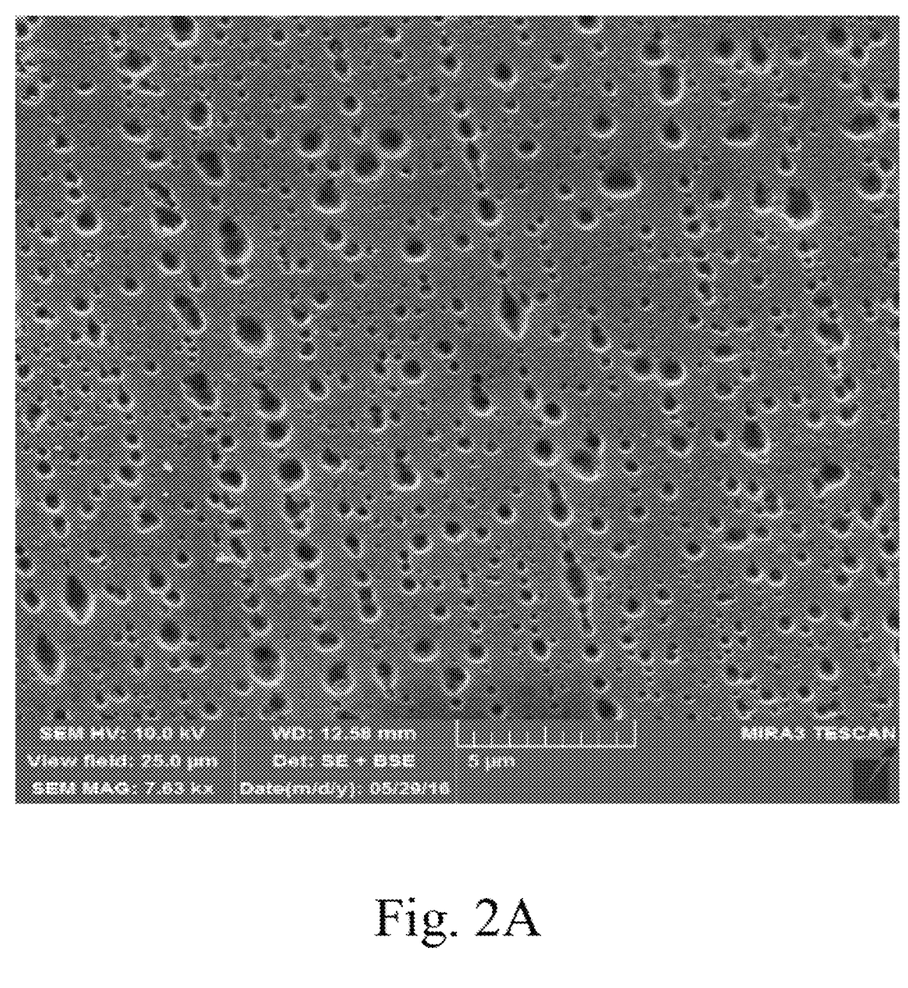
FIG. 2A-D show scanning electron microscope (SEM) images of (a) a porous polysulfone (PSF) surface, (b) a dense PSF membrane surface, (c) a pure polyamide surface, and (d) a 0.5 wt. % CDC polyamide membrane surface within the scope of the invention.
Figure 2B:
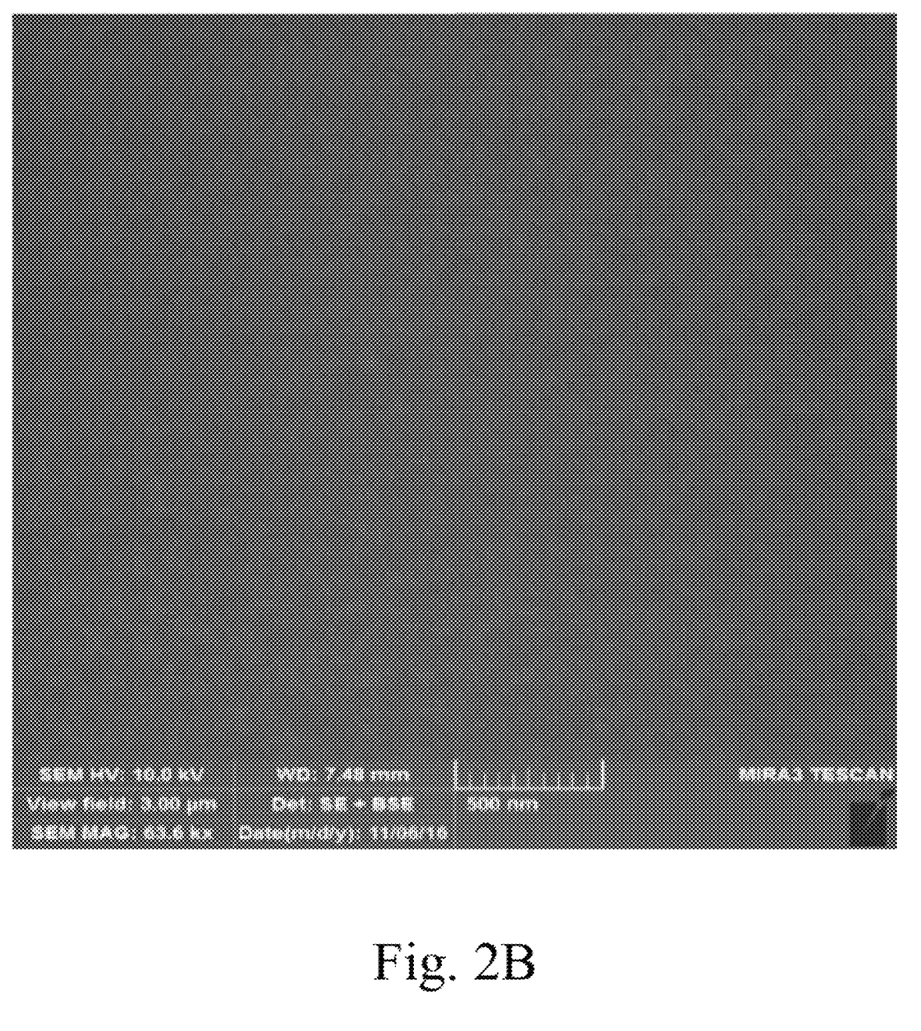
Figure 2C:
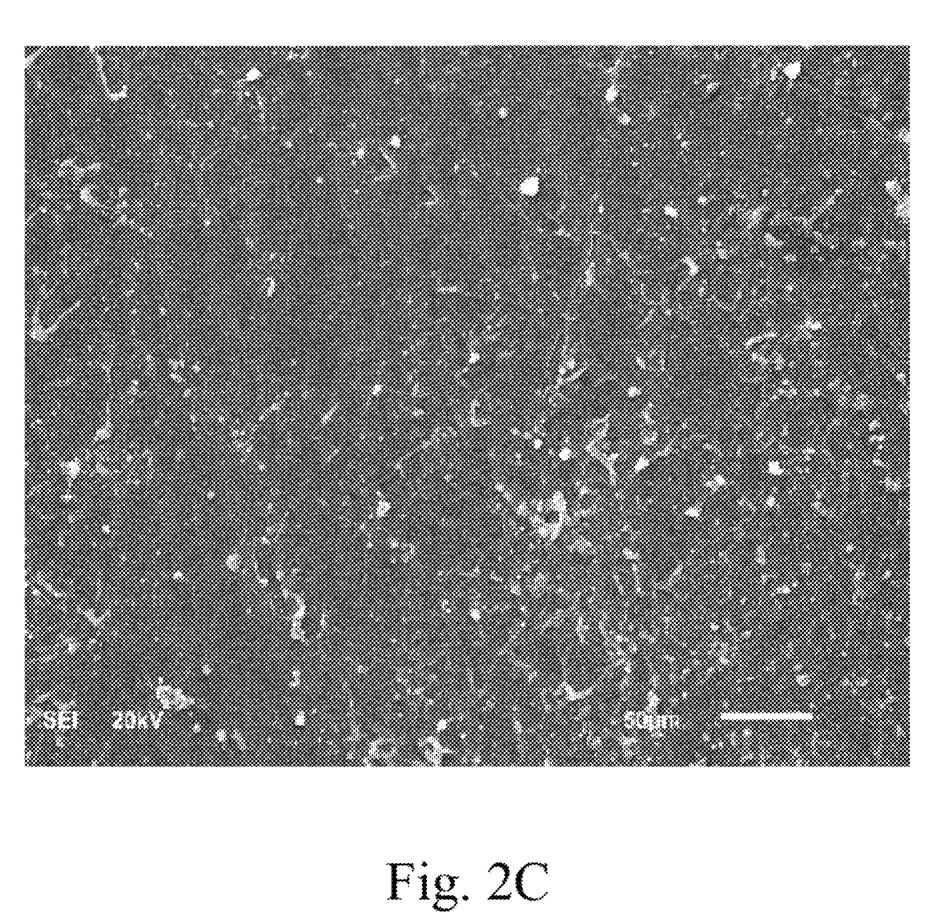
Figure 2D:
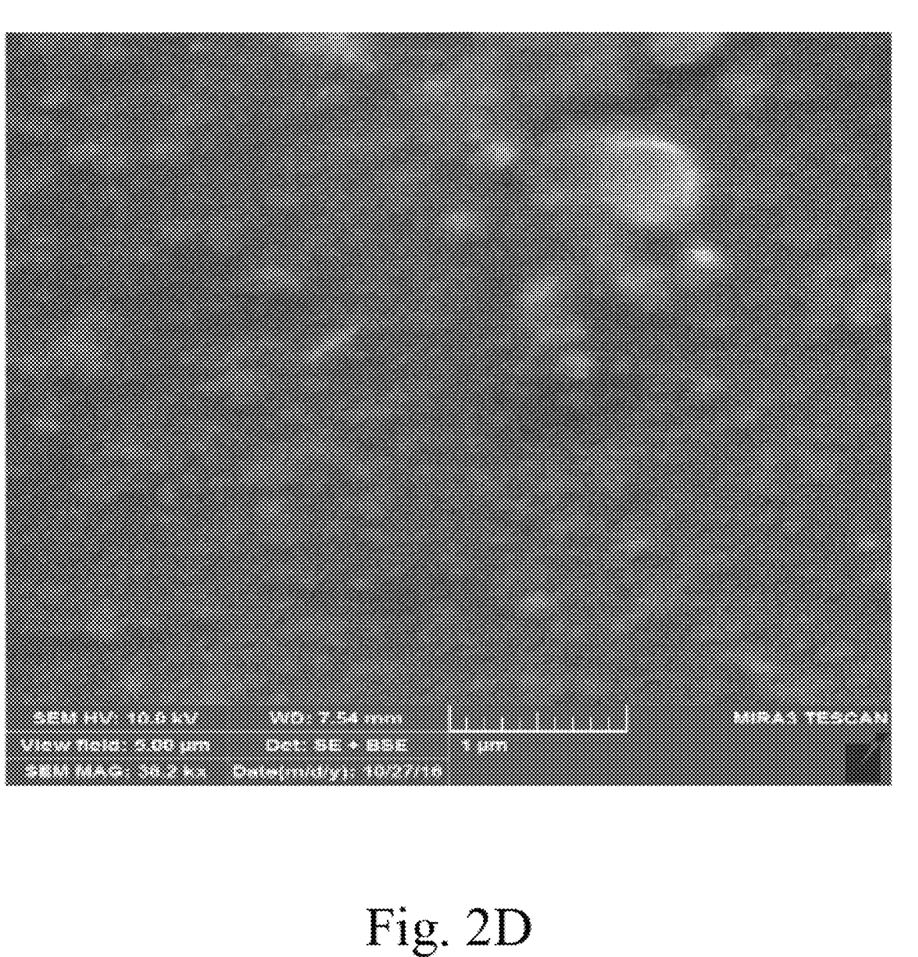

The micrograph SEM images of the polyamide surface (FIG. 2C) and CDC/polyamide MMM surface (FIG. 2D) indicate the formation of a thin layer of composite polyamide and CDC/PA layers on top of PSF support membrane. SEM images show that a defect-free polyamide layer (FIG. 2C) and CDC/polyamide layer (FIG. 2D) were built on top of the PSF support, and the smooth PSF surface (FIG. 2B) was totally covered by a rough and nodular polyamide structure. The polyamide and CDC-polyamide layers were formed as a result of interfacial polymerization reaction between the diamine (here, piperazine) and the dicarboxylate (here, isophthaloyl chloride).

The gas separation performance of the multi-layer membranes, including polysulfone support, and (optionally CDC-doped) polyamide layer(s), fabricated according to the above procedure, was evaluated using pure carbon dioxide ($CO_2$) and methane ($CH_4$) gases at a temperature of 300.15 K (27° C.) and 5 bar feed pressure are shown in Table 3, below.

TABLE 3

Gas separation performance of the fabricated polysulfone support, thin film polyamide membranes, and (CDCs)/polyamide MMMs at 300.15 K and 5 bar.

| Membrane | Loading % | $CO_2$ | $CH_4$ | $CO_2/CH_4$ |
|---|---|---|---|---|
| PSF | 0 | 2.41 | 0.556 | 4.33 |
| PA | 0 | 2.16 | 0.162 | 13.33 |
| MMM4 | 0.5 | 4.07 | 0.204 | 19.92 |

From Table 3, overall experimental results indicate that CDC/polyamide mixed matrix membranes, e.g., MMM4, can provide higher gas permeance and selectivity in comparison with the reference pure polyamide and polysulfone membranes. Without wishing to be bound to any theory, enhanced gas permeation and selectivity were may be attributed to the addition of carbide-derived carbon (CDC) nanoparticles, which can allow faster gas flow through the membrane by disrupting the polymer chain matrix. As indicated by SEM images in FIG. 2D, CDC nanoparticles can disperse well in the polyamide layer. Higher gas permeance may be due to well-dispersed CDC forming channels in polyamide matrix to transport gas molecules more effectively. Furthermore, the gas selectivity of a PSF membrane may be enhanced by including a thin polyamide layer upon the PSF layer, while the gas permeance may decrease as a result of the increased mass transfer resistance.

Figure 3:
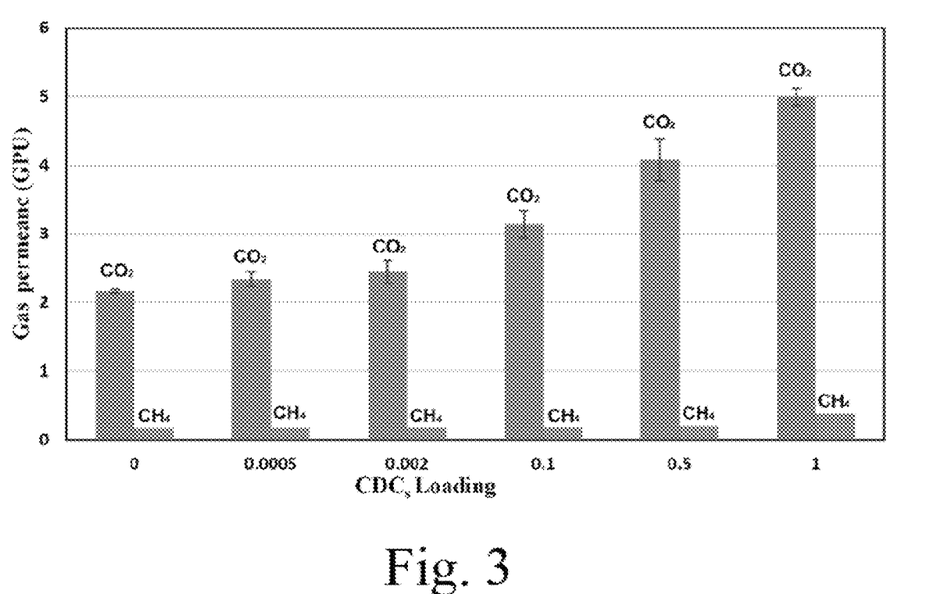
FIG. 3 shows the effect of CDC nanoparticle loading on gas permeance for a mixture of $CO_2$ and $CH_4$.

FIG. 3 shows the change in $CO_2$ and $CH_4$ gas permeance by varying CDCs loading from 0.0005% to 1% in the polyamide-comprising layer for the respective membranes ($MMM_1$-$MMM_5$). The permeation rate of both $CO_2$ and $CH_4$ gas molecules may be enhanced by increasing the CDC nanoparticles content in the polyamide layer(s). This may be attributed to a beneficial interaction between polyamide matrix and nanofiller surface, implying good adhesion of the CDC to the polyamide chain. Moreover, high surface areas and/or porosities of CDC may offer more surface and volume for gases to diffuse through the membrane matrix.

As seen in FIG. 3, even though both $CO_2$ and $CH_4$ gas permeation increased with increasing CDC content in the polyamide layer, the increments were not the same for the two gasses. From FIG. 3, $CO_2$ permeance initially increased from 2.16 GPU for pure polyamide to 2.44 GPU for $MMM_2$ with 0.002 wt. % CDC-loading and continued to increase to 3.13 GPU for 0.1 wt. % CDC-loading, while the maximum $CO_2$ permeance was recorded at 1 wt. % CDC-loading with a value of 5.00 GPU. On the other hand, when CDC concentration was increased to 0.1 wt. %, the permeation of $CH_4$ increased by only 14.8%, with a maximum value of 0.375 GPU observed at 1 wt. % CDC-loading. The unexpectedly higher increase in $CO_2$ permeation relative to $CH_4$ provides improved $CO_2$-versus-$CH_4$ selectivity.

Figure 4:
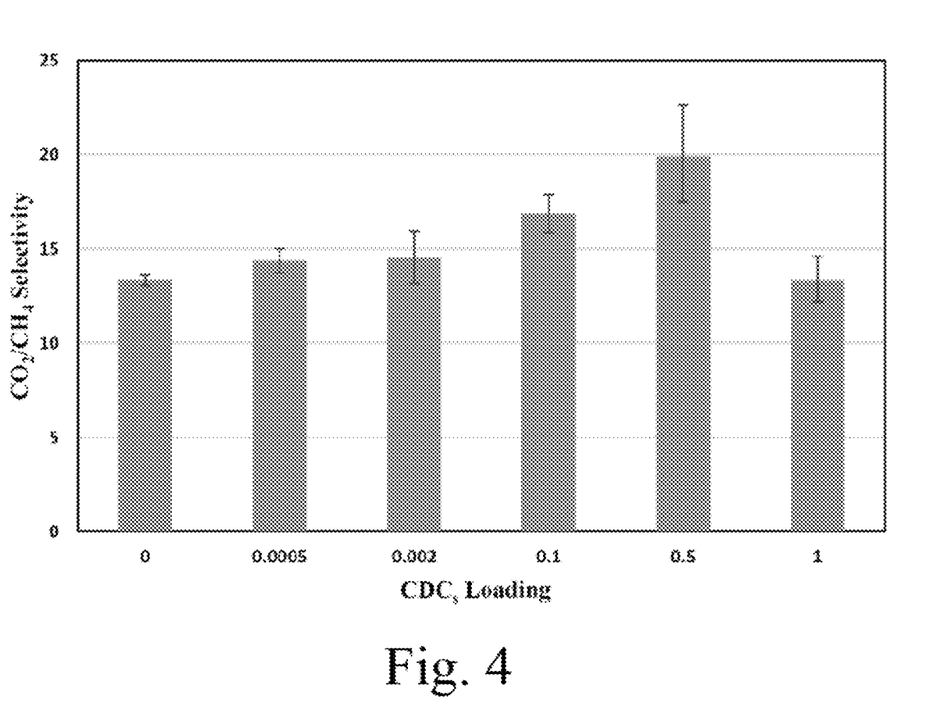
FIG. 4 shows the effect of CDC nanoparticle loading on $CO_2/CH_4$ selectivity.

From FIG. 4, possibly as a result of the good dispersion of CDC nanoparticles in the polyamide layer(s), the $CO_2$-versus-$CH_4$ selectivity improved by increasing CDC loading up to a concentration of 0.5 wt. %, then the gas selectivity unexpectedly declined to 13.31 with 1.0 wt. % TiC-derived CDC-loading. The diminished selectivity of the 1.0 wt. % TiC-derived CDC-loading may arise from nanoparticle agglomeration, which can be observed in SEM images. CDC agglomeration indicates the creation of defects in the membrane surface, possibly resulting in higher $CH_4$ permeance compared to $CO_2$. FIG. 4 shows that when CDC loading increased from 0.5% to 1%, the $CO_2$ permeance increased by 22.8% while the $CH_4$ permeance increased 83.82%, resulting in lower $CO_2$-versus-$CH_4$ selectively.

Figure 5:
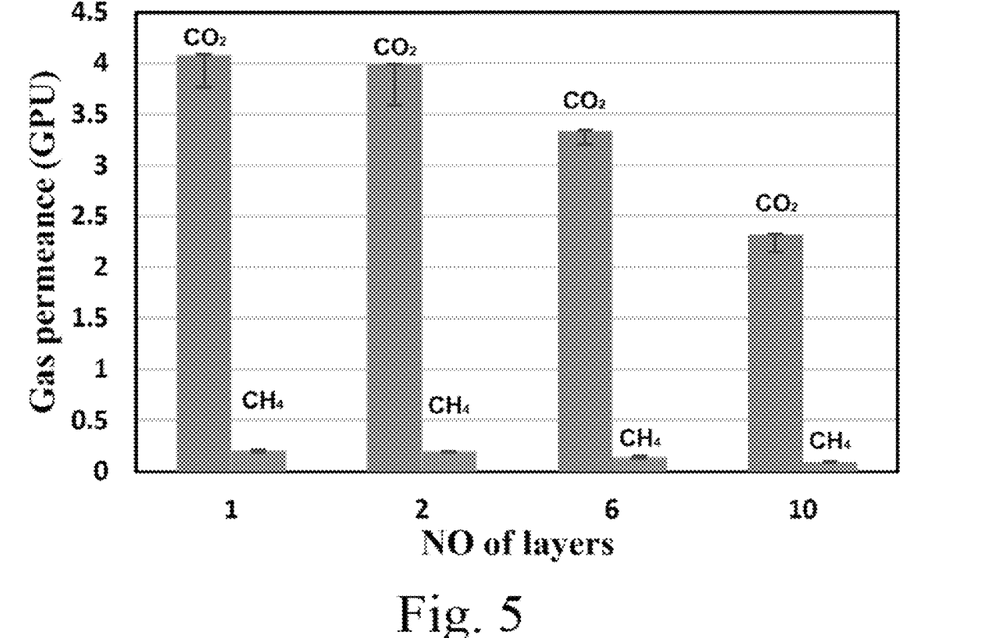
FIG. 5 shows the effect of the number of polyamide layers on gas permeance for a mixture of $CO_2$ and $CH_4$.

The best-performing loading amount selected from $MMM_0$ to $MMM_5$, i.e., 0.5 wt. % CDC-loaded polyamide ($MMM_4$), was then chosen to fabricate CDC/polyamide MMMs including multiple 0.5 wt. % CDC-loaded polyamide layers as follows: $M_1$(1 layer), $M_2$ (2 layers), $M_3$ (6 layers), and $M_4$ (10 layers). FIG. 5 shows the permeance of $CO_2$ and $CH_4$ as a function of the number of 0.5 wt. % CDC-loaded polyamide layers. Both $CO_2$ and $CH_4$ gas permeance were reduced as the number of the layers increased, likely due to higher mass transfer resistance for gas permeation.

Figure 6:
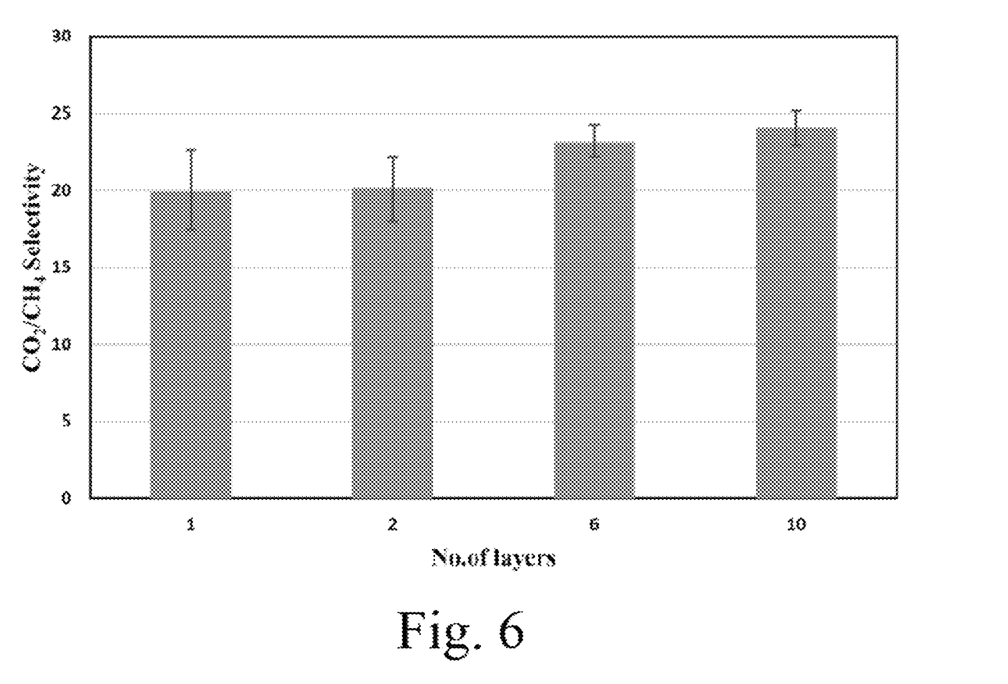
FIG. 6 shows the effect of the number of polyamide layers on $CO_2/CH_4$ selectivity.

FIG. 5 shows that $CO_2$ permeance in 10 CDC-loaded (0.5 wt. %) polyamide layer membrane ($M_4$) reduced from 4.07 GPU to 2.32 GPU. While $CH_4$ permeation decreased from 0.204 GPU to 0.096 GPU. Reduced gas permeance was accompanied by a moderate enhancement in $CO_2$-versus-$CH_4$ selectivity, which is shown in FIG. 6, wherein the selectivity improved by 21% for 10 selective layers. The higher selectivity for $CO_2$ over $CH_4$ with increased layer count may be attributed to functional groups in the CDC/polyamide layer and/or to the presence of larger amount of CDC, which may enhance CDC structural properties, e.g., porosity, to allow higher permeation of $CO_2$ relative to $CH_4$.

Numerous modifications and variations of the present invention are possible in light of the above teachings. It is therefore to be understood that within the scope of the appended claims, the invention may be practiced otherwise than as specifically described herein.

The invention claimed is:
1. A multilayered membrane, comprising:
a first layer, comprising at least 50 wt. % of one or more sulfone-containing polymers;
a second layer, comprising at least 50 wt. % of one or more polyamides comprising, in condensation polymerized form, an aliphatic diamine and an aromatic dicarboxylate; and
at least one carbide-derived carbon (CDC) nanoparticles selected from the group consisting of SiC, $Fe_3C$, WC, $Ti_3SiC_2$, ZrC, $B_4C$, TaC, $Mo_2C$, and TiC-derived nanoparticles, wherein the CDC nanoparticles are embedded in the second layer in an amount of from 0.005 to 0.5 wt. %, based on a total weight of the second layer, wherein the first layer directly contacts the second layer.
2. The membrane of claim 1, wherein the second layer comprises the CDC nanoparticles in a range of from 0.01 to 0.5 wt. %, and
wherein the CDC nanoparticles in the second layer comprise TiC-derived CDC nanoparticles.
3. The membrane of claim 1, further comprising:
at least one additional polyamides-comprising layer comprising the CDC nanoparticles.
4. The membrane of claim 2, wherein the CDC nanoparticles are prepared by a method comprising:
heating titanium carbide and chlorine gas at temperature in a range of from 600 to 1000° C. for a time period in a range of from 2 to 6 hours;
replacing the chlorine gas with hydrogen gas at within 100° C. of the heating in (i); and
replacing the hydrogen gas with inert gas and cooling.
5. The membrane of claim 1, wherein the aliphatic diamine is a cyclic diamine.
6. The membrane of claim 1, wherein the aliphatic diamine comprises at least one selected from the group consisting of a piperazine, 4-aminopiperidine, 3-aminopyrrolidine, 1,4-diaminocyclohexane, 1,4-diaminomethylenecyclohexane, 1,4-diazacycloheptane, 1,5-diazocane, hexahydropyrrolo[3,4-c]pyrrole, hexahydropyrrolo[3,4-b]pyrrole, 3,7-diaza-bicyclo[3.3.1]nonane, 2,5-diazabicyclo[2.2.2]octane, 3,8-diazabicyclo[3.2.1]octane, 2,5-diazabicyclo[2.2.1]heptane, ethylenediamine, 1,3-diaminopropane, 1,4-butanediamine, and 1,5-pentanediamine.
7. The membrane of claim 1, wherein the aliphatic diamine comprises piperazine and a content of the piperazine is at least 75 wt. % relative to total aliphatic diamine.
8. The membrane of claim 1, wherein the dicarboxylate comprises at least one selected from the group consisting of 1,3-benzenedicarboxylate (isophthalate), 1,4-benzenedicarboxylate (terephthalate), 1,2-benzenedicarboxylate (phthalate), 2,6-naphthalenedicarboxylate, 2,3-naphthalenedicarboxylate, 1,4-naphthalenedicarboxylate, 1,5-naphthalenedicarboxylate, 1,7-naphthalenedicarboxylate, 1,2,3,4-tetrahydro-1,4-naphthalenedicarboxylate, 2,6-pyridinedicarboxylate (dipicolinic acid), 2,5-pyridinedicarboxylate (isocinchomeronic acid), and 1H-pyrrole-2,4-dicarboxylate.

9. The membrane of claim 1, wherein the dicarboxylate comprises 1,3-benzenedicarboxylate and a content of the 1,3-benzenedicarboxylate is at least 75 wt. %, relative to total dicarboxylate.

10. The membrane of claim 1, wherein the sulfone-containing polymer is of formulae (I), (II), (III), (IV) or (V):

(I)

(II)

(III)

(IV)

(V)

wherein
Ar, Ar', and Ar'' are independently aromatic residues,
Y and Z are independently aliphatic, cycloaliphatic, aromatic, or heterocyclic residues, and
n is in a range of from 100 to 100,000.

11. The membrane of claim 10, wherein the sulfone-containing polymer comprises at least one selected from the group consisting of (PSU)

(PES)

(PAS)

(PPSU)

(PSF)

, and/or

12. The membrane of claim 11, wherein the sulfone-containing polymer is PSF having a $M_w$ from 10,000 to 50,000.

13. A gas filter or gas treatment apparatus, comprising the membrane of claim 1.

14. A method, comprising:
passing a gas mixture, comprising $CO_2$ and at least one additional gas, through the membrane of claim 1, to obtain a permeate that is enriched in $CO_2$ content.

15. The method of claim 14, wherein the at least one additional gas is methane.

16. A method of preparing the multilayered membrane of claim 1, comprising:
combining a sulfone-containing polymer with a polar aprotic solvent, to obtain a first mixture;
mixing an alcohol with the first mixture, to obtain a second mixture;
casting the second mixture onto a surface to create a layer with a thickness in a range of from 100 to 400 μm;
drying the layer, to obtain a dried sulfone-containing polymer layer;
polymerizing, on the dried sulfone-containing polymer layer, a composition comprising an aliphatic diamine and an aromatic dicarboxylate, wherein the composition further comprises at least one CDC nanoparticle selected from the group consisting of SiC, $Fe_3C$, WC, $Ti_3SiC_2$, ZrC, $B_4C$, TaC, $Mo_2C$, and TiC-derived carbon CDC nanoparticles, to obtain the CDC-doped polyimide layer comprising the CDC nanoparticles in an amount of from 0.005 to 0.5 wt. % in direct contact with the sulfone-containing polymer layer.

17. The method of claim 16, wherein the CDC nanoparticles comprise TiC-based CDC nanoparticles.

18. The method of claim 16, further comprising:
repeating the polymerization to obtain two or more polyamide layers on the membrane.

* * * * *